US007008022B2

(12) United States Patent
Cassaday

(10) Patent No.: US 7,008,022 B2
(45) Date of Patent: Mar. 7, 2006

(54) LEVER ARM WITH TACTILE CONTOUR

(75) Inventor: Terrence Joesph Cassaday, Toronto (CA)

(73) Assignee: Ergo-Industrial Seating Systems Inc., Mississauga (CA)

( * ) Notice: Subject to any disclaimer, the term of this patent is extended or adjusted under 35 U.S.C. 154(b) by 0 days.

(21) Appl. No.: 10/736,626

(22) Filed: Dec. 17, 2003

(65) Prior Publication Data

US 2005/0146196 A1    Jul. 7, 2005

(51) Int. Cl.
A47C 7/62       (2006.01)
G09F 3/00       (2006.01)

(52) U.S. Cl. .............................. 297/463.1; 297/463.2; 297/217.3; 297/217.4; 297/217.5; 40/320

(58) Field of Classification Search ............ 297/463.1, 297/463.2, 217.3, 217.4, 217.5; 40/320, 40/727

See application file for complete search history.

(56) References Cited

U.S. PATENT DOCUMENTS

| | | | | |
|---|---|---|---|---|
| 4,868,888 A | * | 9/1989 | Dayton | 297/217.4 X |
| 5,318,340 A | * | 6/1994 | Henry | 297/217.3 X |
| 5,630,647 A | | 5/1997 | Heidmann et al. | |
| 5,678,886 A | * | 10/1997 | Infanti | 297/217.3 |
| 5,700,051 A | | 12/1997 | Newhouse | |
| 5,779,305 A | * | 7/1998 | Hocking | 297/217.4 |
| 5,807,177 A | * | 9/1998 | Takemoto et al. | 297/217.3 X |
| 6,102,476 A | * | 8/2000 | May et al. | 297/217.3 |
| RE36,928 E | | 10/2000 | Newhouse et al. | |
| D458,777 S | | 6/2002 | Benden et al. | |
| 6,530,842 B1 | * | 3/2003 | Wells et al. | 297/217.3 X |
| 6,609,760 B1 | * | 8/2003 | Matern et al. | 297/463.1 |
| 6,923,502 B1 | * | 8/2005 | Cassaday | 297/217.3 |
| 2002/0070590 A1 | * | 6/2002 | Carstens | 297/217.3 |
| 2003/0184144 A1 | * | 10/2003 | Matern et al. | 297/463.1 |
| 2004/0007907 A1 | * | 1/2004 | Di Re | 297/217.3 |
| 2005/0023871 A1 | * | 2/2005 | Cassaday | 297/217.3 |

FOREIGN PATENT DOCUMENTS

CA       2327000 A1    5/2002

* cited by examiner

Primary Examiner—Rodney B. White
(74) Attorney, Agent, or Firm—Eugene J.A. Geirczak

(57) ABSTRACT

A control lever having one end adapted for attachment to a resting device for controlling movement thereof, and another end having a tactile contour for identifying said control lever.

20 Claims, 3 Drawing Sheets

LEVER ARM WITH TACTILE CONTOUR

FIELD OF INVENTION

The present invention relates to a control lever having one end adapted for attachment to a resting device such as a chair and another end having a tactile contour for identifying the control lever. The invention also relates to a chair having a plurality of levers where each of said levers have a different tactile contour for distinguishing the levers. A guide is associated with said plurality of levers having different tactile shapes. The invention also relates to a method of correlating a plurality of lever control arms with respective corresponding plurality of movements of a chair, using a guide.

BACKGROUND TO THE INVENTION

Resting devices such as a chair or bed may be adjusted to fit the comfort of an individual user.

Contemporary chairs particularly utilised in an office are becoming more sophisticated with respect to the different adjustments that can be made to these types of chairs. Typically such chairs provide that both the back and the seat of the office chair can be separately adjusted to a number of different settings by utilising a plurality of chair lever control arms. Generally speaking, all chair lever control arms or controls are generally located below the chair seat. This is generally the case for adjustable beds of the type having control arms located below the bed.

A particular draw back of such prior art chairs resides in the likelihood that understanding of the use of the controls is often difficult. Much of the difficulty results from the positioning of the lever control arms below the chair seat where they are not readily visibly assessable.

Accordingly, it is not unusual that the operation of most chair controls is understood after a trial and error test done by a person using the chair. Such person will generally try each control to determine its function and may reach a full understanding of the chair controls only after extended chair usage. This can be frustrating as the chair control arms can move a chair part, which has already been set to an appropriate optimal position, and require resetting. In some case, such person may not be able to properly reset the chair for optimal usage.

In other cases movement of the lever control arms or devices without an understanding of its function can lead to adjustment of the chair parts which is inappropriate. For example, some chairs are equipped with a tension device that is rotatable and adjusts the tension on the "free float" tilting motion of the chair. This "free float' motion may be locked (i.e. prohibits the swing) or unlocked by a chair lever arm. If the tension is adjusted for a heavy person and a light person sits on the chair it is possible that the light person may be catapulted forward by the spring activated movement when the lever arm is unlocked.

Accordingly, various prior art devices have heretofore been constructed in order to address the difficulties referred to above.

For example, reissue U.S. Pat. Re. 36,928 relates to an operational guide mounted to an adjustable chair where the guide includes a card having a pictorial guide for operating the adjustable chair located on the top side of the card.

Moreover, some prior art chairs included lever control arms having an end with a serrated edge along one side thereof.

In other cases, Braille has been disposed on a top surface of a lever control arm in order to permit a blind person to locate the particular lever control arm and convey information regarding same.

However, it is difficult for the general public to decipher the meaning of a serrated edge or Braille disposed on a lever control arm. Furthermore it is generally difficult to visually represent a serrated edge or Braille on a screen or guide which is easy to see or understand.

Moreover the prior art devices have not addressed the issue of assisting a user to understand the operation of a lever control arm, apart from providing an instructional manual in a booklet of written form. In some prior art devices summaries of instructions are provided on a card as shown in U.S. Pat. No. Re. 36,928 or card pivoting outwardly from an arm of a chair.

According, it is an object of this invention to provide an improved lever control arm for a chair, which is more easily and readily understood by the general public.

It is a further object of this invention to provide an improved chair having control levers for adjusting a chair having an improved method of conveying information concerning its functionality.

It is an aspect of this invention to provide a control lever having one end adapted for attachment to a resting device for controlled adjustment thereof and another end having a tactile contour for identifying the control lever.

It is another aspect of this invention to provide a plurality of levers each having one end adapted for attachment below a chair seat or controlling separate movements of a chair, each said lever having another end having tactile shapes different from one another so as to distinguish said levers.

It is another aspect of this invention to provide a chair having a selectively moveable back and seat and a plurality of control arms attached below said seat for activating selected movements of said back and seat wherein said one of said control arms includes an end having a tactile shape different from an end of another one of said control arms.

It is another aspect of this invention to provide a chair having a selectively moveable back and seat including a first lever control arm having one end attached below the seat and another end presenting a tactile shape, said first lever arm activating a selected movement of said back or seat; a second lever control arm having one end attached below said seat and another end presenting a tactile shape, said second lever control arm activating another selected movement of said back or seat different from said first lever control arm; said tactile shape of said second lever arm different from said tactile shape of said first lever arm; and a guide presented by the arm of the chair for displaying the different tactile shapes and the associated movements of said first and second lever control arms.

It is another aspect of this invention to provide a guide for a chair having a plurality of lever control arms with ends having different tactile shapes, for activating a selective orientation of a back or seat of a chair comprising: a screen having visual representations corresponding to each said different tactile shapes; information associated with said visual representations and corresponding to selective orientations activated by said plurality of lever control arms respectively.

It is another aspect of this invention to provide a method of correlating a plurality of separate movements of a chair with a plurality of lever control arms activating said movements respectively comprising the steps of: providing a plurality of lever control arms with ends having different tactile contour shapes; displaying a guide having said shapes with information associated with said movements of said plurality of lever control arms respectively.

These and other objects and features of the invention shall now be described in relation to the following drawings.

DETAILED DESCRIPTION OF THE INVENTION

Figure 1:
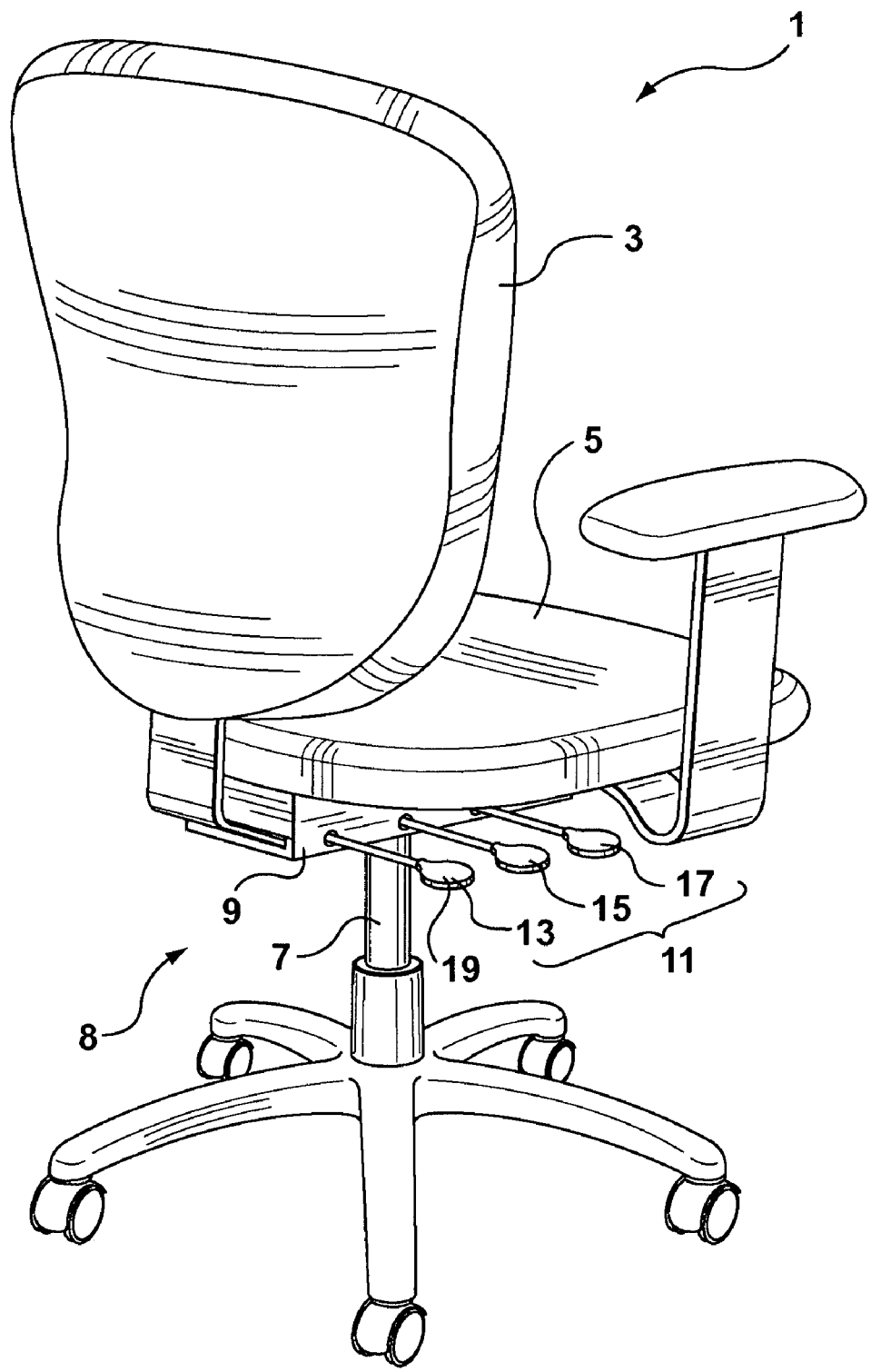
FIG. 1 is the rear perspective view of an office type chair having moveable chair parts and controls for those moveable chair parts. The chair shown in FIG. 1 is of a conventional design and is labelled as prior art.

In the description that follows, like parts are marked throughout the specification and drawings with the same respective reference numerals. The drawings are not necessarily to scale and in some instances proportions may have been exaggerated in order to more clearly depict certain features of the invention.

DESCRIPTION OF THE PRIOR ART

FIG. 1 shows a typical example of a prior art office type chair 1. The chair includes a chair back 3, a chair seat 5, and a support frame 8 which includes a vertical column 7 and a frame 9 which supports the chair 1.

The back 3 and seat 5 of the chair 1 are adjustable to different positions. For example, the chair back 3 may be vertically adjusted at an angle relative to the seat 5. Moreover the seat 5 may be adjusted relative the horizontal. Furthermore, the height of the seat 5 may also be adjusted from ground level, in a manner well known to persons skilled in the art. Furthermore, other parts of the chair may also be adjustable.

The different adjustments or movements of each of the above chair parts is activated by a number of control levers or chair lever control arms 11. Generally speaking prior art lever control arms 13, 15, and 17 are identically shaped. Generally speaking the prior art devices comprise lever arms 13, 15, and 17 having a substantially flat circular paddle at one end of the lever arm as shown. Furthermore they generally lie in substantially planar side-by-side relationship in close proximity to one another.

Accordingly, a user will generally have difficulty distinguishing one control arm 13 from the others 15 and 17. Generally speaking the user will need to operate the control to determine which chair part is controlled by the respective control lever 13, 15, and 17. If the correct chair control lever 11 is not chosen, difficulties may arise as described above.

Figure 2:
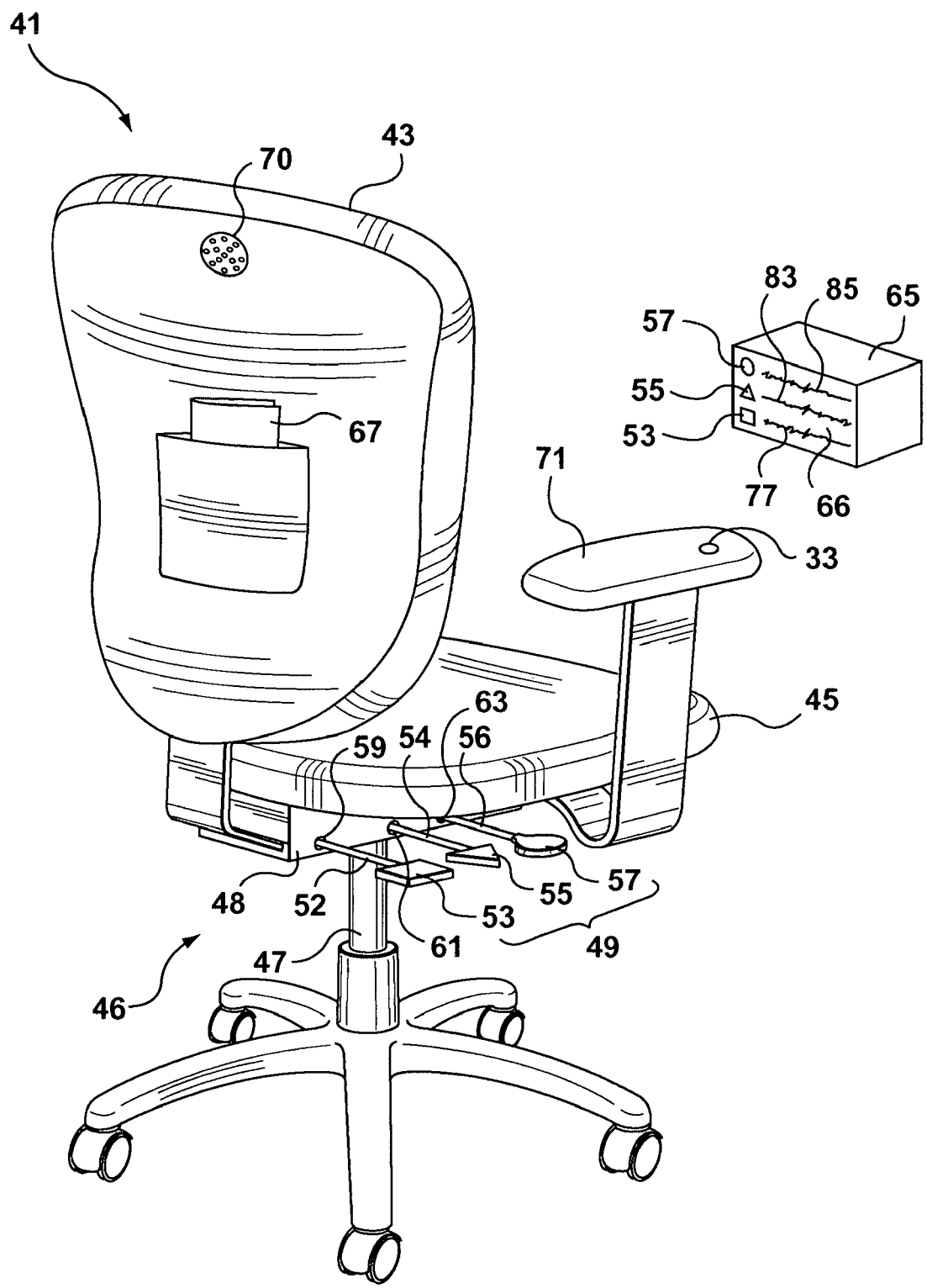
FIG. 2 is a perspective view of a chair and a display or control guide according to one preferred embodiment of the present invention.

FIG. 2 shows a chair 41 according to one preferred embodiment of the present invention. The chair 41 includes a back 43 and a seat 45 with a lower frame 46. The lower frame 46 includes height adjustment means 47 and a frame 48 to which the seat 45 is attached and supported.

The height adjustment means 47 can comprise of a number of devices including telescoping cylinders which comprise a gas cylinder for adjusting the height of the seat 45 relative to the floor in a manner well known to those persons skilled in the art.

A plurality of control levers or lever control arms 49 are disposed below the seat 45. In particular, the plurality of lever control arms 49 extend from the frame part 48. Three lever control arms 52, 54 and 56 are shown although any number of lever control arms may be utilised. Each of the lever control arms 52, 54 and 56 present one end 59, 61 and 63 respectively which are adapted for attachment to the chair. In particular, the one end 59, 61 and 63 of the lever control arms 52, 54 and 56 respectively extend from the frame part 48 and are fastened to the appropriate adjustment mechanisms not shown but well known to those persons skilled in the art. For example, the one end 59, 61 and 63 of the lever control arms 49 may be snapped on or virtually engaged by the appropriate adjustment mechanisms.

The other end 53, 55, 57 of the lever control arm 52, 54 and 56 respectively have a shape or tactile contour for identifying the control levers 49. In particular, each of the other ends 53, 55, 57 of the control levers 49 have a tactile contour which is different from one another so as to easily and readily distinguish the lever. The geometric shapes shown in the drawings, namely the circle, square and triangle are easily and readily distinguishable from one another by tactile contact with a users fingers (since the levers are located below the seat and out of view) in a way which has not been done before, either by serrated edge, Braille, or otherwise.

Each of the tactile contours 53, 55 and 57 are substantially flat or planar and define a substantially two-dimensional tactile shape for identifying the control levers 49. In particular, the tactile shapes 53, 55 and 57 are planer having a peripheral edge 65, 67 and 69 defining the shapes. The peripheral edges 65, 67 and 69 may be flat, smooth or curved.

The tactile contours or shapes 53, 55 and 57 as shown in the figures are disposed substantially horizontally relative to the chair 41 and seat 45 although they can also be disposed substantially vertically or other orientation relative to the chair 41.

The shapes of the other end 53, 55 and 57 of the control levers 49 are in one embodiment selected from the group of circular, rectangular, triangular, square, oval or half-circular shapes. However other geometrical shapes, letters or symbols can be selected such as an arrow which may be oriented upwardly or downwardly to convey a selected message. Generally, this group defines planer shapes. The invention should not be limited to the shapes belonging to this group, as the group has been included as an example only. Any tactile contour shape can be selected so long as it is easily and readily distinguished by a person's tactile feel by the fingers or the like. It is possible that 3-dimensional shapes such as spheres, pyramids or cubes could be utilised, although it has been found that planer 2-dimensional shapes as described are easily distinguishable by touch or feel.

Furthermore these shapes are in one embodiment disposed in two dimensional space, with a depth (i.e. third dimension) defining a peripheral edge 39, 41, and 43 of tactile contour 53, 55, and 57 of lever arms 52, 54, and 56 respectively.

In one embodiment the tactile contours are defined and perceived by a user operably contacting the peripheral edge 39, 41, and 43 which define the shapes 53, 55, and 57.

Alternatively the planar surfaces S, T, C of tactile contours 53, 55, and 57 may be contoured. For example S may have a smooth surface, while T may be stippled and C being concave, provided such surface is capable of tactile perception and can be visually perceived and in one embodiment represented by indicia such as a visual symbol or in writing.

Accordingly, the user of a chair is able to reach down and grasp any of the lever control arms 49 and recognise the distinctive shapes or contours that has been grasped as either circular, triangular, square, half-circular, rectangular, oval or the like. As such, the person may then activate the appropriate control lever to adjust or move the respective response in adjusting or moving the seat 45 or back 43 of the chair.

Such user may then easily remember the particular function of the lever control arms 49 after a few uses as the tactile contours have different shapes. The geometric shapes shown in the figures i.e. circle, triangle, and square are easily remembered.

Furthermore the side to side spacing can be selected to permit unobstructed manipulation without interference from the other control arms by a users fingers.

A person can in accordance with another embodiment of this invention, utilise a display or control guide With the invention described above to determine what the particular control lever will do from the shape of the tactile contour.

More specifically, FIG. 2 shows a control guide or display 65 may comprise a computer monitor, which is associated with the plurality of levers 49. The computer monitor 65 may be disposed in the vicinity of the chair 41 so that a person sitting in the chair 41 can easily view the monitor screen, which will show or visually display representations of all of the shapes embraced by the tactile shapes 53, 55 and 57.

In the embodiment shown the computer screen 66 will visually illustrate a circular, triangular and square representation. In one embodiment, the circular shape will appear at the top of the screen, while the triangular shape will appear at the middle of the screen, and the square shape appear at the bottom of the screen. Each of the shapes will have associated therewith on the screen information pertinent to the control having the particular shape.

For example, the circular shape 57 is shown on the computer monitor 65 with indicia or information 85 beside it that the circular shape lever control arm 49 will tilt the chair back 43 vertically relative to the seat 45. The triangular tactile shape 55 will also appear on the computer monitor 65 with indicia or information 83 beside it that the triangular lever will move the seat 45 at an angle to the horizon. The square tactile shape 53 will appear on the computer monitor 65 with indicia or information 77 beside it that activating the lever 49 will move the seat 45 vertically, upwardly or downwardly relative to a surface.

Accordingly, a person using the chair 41 could then refer to the visual shapes described above on the monitor screen and reach down and feel for the particular control arm 49 that they need to make a particular chair adjustment.

In another embodiment, the control guide information 77, 83, and 85 may be on a website, which could be accessed by the user. Alternatively, the control guide 65 may comprise of written information obtained in a booklet 67, which can be stored in association with the chair as shown. Such booklet 67 may have pictures of the various different shapes and information concerning the operation and adjustment of each of the controls according to the shape of the handles.

In another embodiment, the control guide 65 may be an audible rather than a visual guide. The user of the chair 41 can access this information by pressing a switch 33, which may be disposed on the arm 71 and an audible recording which has been stored on, in or in association with the chair 41, will then be activated and heard through an audio output such as a speaker 70 provided in the back of the chair or other location. Appropriate wires (not shown) and power supplies (not shown) can be provided to activate the audio information. Alternatively, the switch 33 may activate the speaker 70 by wireless means.

Figure 3:
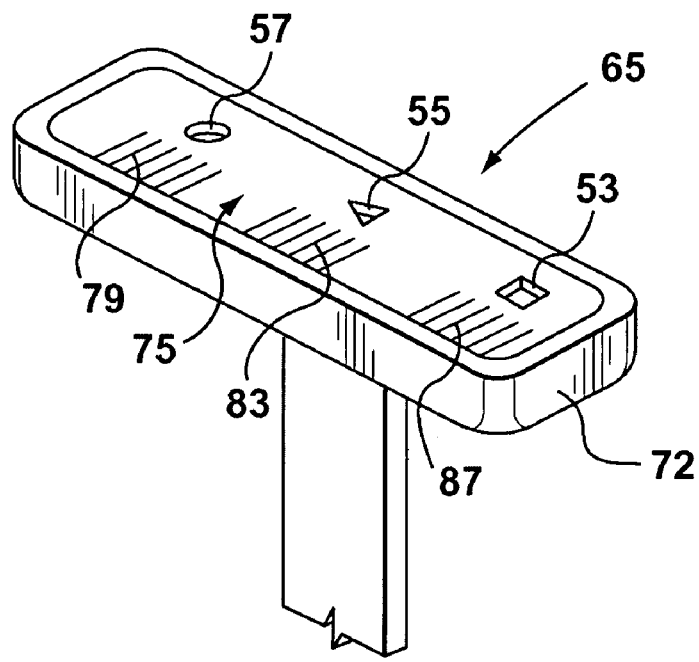
FIG. 3 is an enlarged perspective view of the armrest from the chair of FIG. 2 according to a further preferred embodiment of the present invention.
Figure 4:
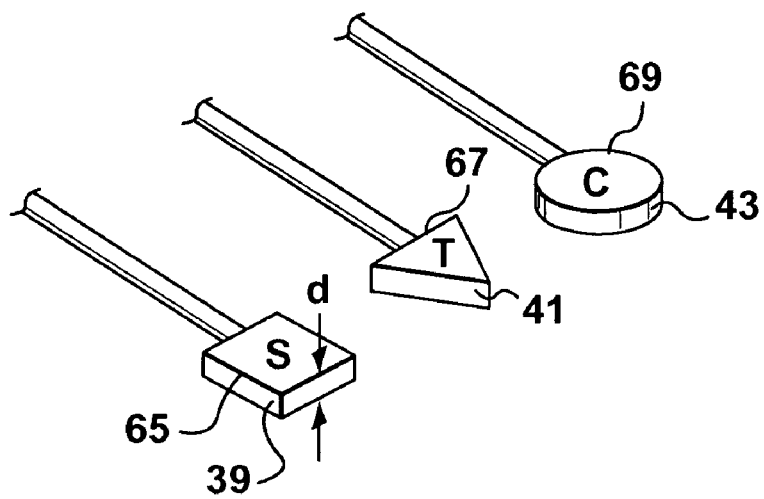
FIG. 4 is an enlarged perspective view of the control lever arms removed from the chair FIG. 2.

FIG. 3 shows still another embodiment of the invention in which the control guide or display 65 is carried or provided in the armrest 71 of the chair. The display is electronic in one embodiment. The display or control guide 65 is presented on the upper surface of the armrest 71 and in one embodiment will be visible at all times. The control guide 65 can comprise of a liquid crystal display screen or other electronic screen, which can display the shapes of the tactile contours and include information concerning the various functions of the levers 49. The display 65 can also comprise of buttons 57, 55 and 53 which correspond to the shape of the tactile contours which in one embodiment can be pressed so as to provide information 79, 83, and 87 respectively. Information 79, 83 and 87 corresponding to the levers 49 having the contour shapes 57, 55 and 53 are displayed in association therewith as shown in FIG. 3.

Alternatively, the visual representation 57, 55 and 53 can comprise of a visual electronic image, which is active by the touch of a finger that changes the electronic characteristics such as inductance or the like to turn on the written information 79, 83 and 87 respectively.

Alternatively the shapes of the buttons 57, 55, 53 may be embossed printed or recessed into the material of the arm rest during the fabricating or moulding step which buttons could include the words "RAISE", "LOWER" and "TILT" for example embossed, printed or recessed inside or close to the buttons to act as a guide to the user of the chair. This would act as a guide to the user feeling the lever arms and looking at the shapes on the armrest to prompt the user as to the function of the appropriate lever arm.

Furthermore by utilising the easily recognisable tactile shapes as described in association with shapes that are easily visually represented on a guide such as a computer screen or electronic display on a chair arm (where resolution may be limited) the user can select the appropriate lever arm for the desired movement of the chair. These advantages are not readily available on those prior art chairs utilising a serrated edge on a lever arm (i.e. pixel size of the screen may not permit visual representation of a serrated edge, particularly to someone with poor eyesight) or Braille on the surface of a lever arm.

In one embodiment shown in FIGS. 2 and 3 the order or sequence is the same on the display 65 as on the levers 57 55 and 53 to assist in remembering and operation. In other words the visual appearance or order of the buttons 57, 55 and 53 on the display 65 is the same as the order of the tactile contours 57, 55 and 53. However the invention is not to be limited to this particular order as benefits can be experienced with the sequence of the lever arms being different from the buttons.

Although not shown it is possible that a hinged cover can be attached to the upper surface of the armrest 71 so as to cover the display or the control guide 65. The information 77, 83 and 85 is more visually accessible to the user of the chair 41 than the controls, which are located below the chair seat. The user of the chair 41 is able to simply reach down to feel the tactile shape of the ends of the lever control arms 49 which are readily recognisable to the touch of the user and then the user can refer to the control guide 65 to determine which lever control activates which part of the chair.

Although the invention has been described herein with lever control arms 49, which are substantially of the same length, such lever control arms 49 may have different lengths.

The information to be displayed can be selected to include basic instructions concerning the operation of the lever control arms 49 or the literal information can scroll across the screen to provide full operational information concerning the chair as well as the lever control arms 49.

Although only three lever control arms 49 have been described a plurality of lever control arms can be utilised. Alternatively, at least two lever control arms can be utilised in accordance with the invention described herein. As described above, each of the levers 52, 54 and 56 are associated with a control guide or display 65, which display includes a visual representation corresponding to the shape and information corresponding to the separate movements of the chair. Furthermore it is also possible that one or more control arms 49 be disposed on both side of the seat 45.

The display 65 has indicia 77, 83 and 85 for correlating the different tactile shapes of the control means and their associated movements.

The invention described herein shows a chair 41 having a selectively moveable back 43 and seat 45 including:

(a) a first lever control arm 52 having one end 59 attach below the seat 45 and another end 53 presenting a tactile shape, said first lever arm 52 activating a selective movement of the back 43 or seat 45;

(b) a second lever control arm 54 having one end 61 attach below the seat 45 and another end 55 presenting a tactile shape, said second lever arm 54 activating another selective movement of the back 43 or seat 45 different from the first lever control arm 52;

(c) the tactile shape 55 of the second lever arm 54 is different from the tactile shape 53 of the first lever arm 52;

(d) a display 65 presented by the arm of the chair 41 for displaying the different tactile shapes and indicia from the associated movements of the first and second lever control arms.

The invention described above also illustrates a display 65 for a chair 41 having a plurality of lever control arms 52, 54 and 56 for activating a selected orientation of the back 43 or a seat 45 of the chair 41 comprising:

(a) a screen 66 having visual representations corresponding to each of the different tactile shapes; and (b) information 79, 83 and 87 associated with the visual representations and corresponding to the selected orientations activated by the plurality of lever control arms respectively.

Finally the invention described herein illustrates a method of correlating the plurality of movements of a chair with a plurality of lever chair control arms 49 respectively comprising the steps of:

(a) providing a plurality of lever control arms having ends with different tactile contour shapes;

(b) displaying a guide having the shapes with information associated with said movements of said plurality of level control arms respectively.

Although the preferred embodiment as well as the operation in use have been specifically described in relation to the drawings, it should be understood variations of the preferred embodiment can be achieved by a person skilled in the trade without departing from the spirit of the invention as claimed herein.

I claim:

1. At least two control levers each having one end attached to a resting device, said at least two control levers controlling movement thereof, and each lever having another end with a tactile contour for identifying said control lever, said contour selected from the group of
   (a) circular, triangular, square, rectangular, oval, and half circular shapes,
   (b) spherical, pyramidal, cubical, letters and arrow shapes wherein said contour of one of said levers is different from said contour of said other lever;
   each said lever controlling a different movement of said resting device and wherein each said tactile contour presents a peripheral edge permitting tactile perception and association of said lever with said respective movement of said resting device; and
   a guide displaying said different geometric shapes and associated movements of the first and second lever control arms.

2. At least two control levers as claimed in claim 1 wherein said peripheral edge is disposed in a plane.

3. At least two control levers as claimed in claim 1 wherein each said control lever is associated with a control guide including information corresponding to said shapes and the associated movements of said levers.

4. At least two control levers as claimed in claim 3 wherein said information comprises a visual representation corresponding to said shapes.

5. A control lever as claimed in claim 3 wherein said information comprises audio information corresponding to said shapes and controlled movement of said resting device.

6. A plurality of levers each having one end attached below a seat of a chair, said plurality of levers controlling separate movements of a chair controlling separate movements of a chair, each said lever having another end presenting a substantially planar surface terminating at a periphery, said periphery defining a shape different from one another so as to actually distinguish said levers and the associated movements of said chair controlled by said levers, at least two of said plurality of levers having a periphery defining a shape selected from the group of circular, square, rectangular, oval and half circular shapes, each of said levers associated with a control guide displaying said different shapes and information corresponding to said separate movements of said chair respectively.

7. A plurality of levers as claimed in claim 6 wherein each said planar surface is flat.

8. A plurality of levers as claimed in claim 7 wherein each said planar surface is disposed substantially horizontally relative said chair seat.

9. A plurality of levers as claimed in claim 6 wherein said control guide is carried by an arm of said chair.

10. A chair having a selectively moveable back and seat and a plurality of control means attached below said seat activating selected movements of said back and seat, wherein at least one of said control means includes an end having a peripheral edge defining a first shape different from the shape of a second peripheral edge of another one of said control means, said shapes selected from the group of circular, square, rectangular, oval and half circular shapes tactically identifying said levers with their associated movement of said back and seat, and a guide displaying said first and second shapes of the at least one of said control means and another one of said control means.

11. A chair as claimed in claim 10 wherein said peripheral edges lie in a substantially flat plane.

12. A chair as claimed in claim 11 further including a guide presented by an arm of said chair displaying indicia correlating said different shapes of said control means and their associated movements of said back and chair.

13. A chair as claimed in claim 12 wherein said indicia includes audio information.

14. A chair as claimed in claim 12 wherein said indicia includes visual representation of said shapes.

15. A chair having a selectively moveable back and seat including:
 (a) a first lever control arm having one end attached below said seat, and another end having a first geometric shape, said first lever control arm activating a selective movement of said back or seat;
 (b) a second lever control arm having one end attached below said seat and another end having a second geometric shape, said second lever control arm activating another selective movement of said back or seat different from said first lever control arm;
 (c) said second geometric shape different from said first geometric shape;
 (d) a guide presented by an arm of said chair displaying said different geometric shapes and the associated movements of said first and second lever arms.

16. A chair as claimed in claim 15 wherein said guide comprises a display including:
 (a) a first button visually corresponding to said first geometric shape of said first lever arm;
 (b) a second button visually corresponding to said second geometric shape of said second lever arm.

17. A display as claimed in claim 16 wherein said display includes information corresponding to said different geometric shapes and associated movements of said first and second lever control arms.

18. A method of correlating at least two separate movements of a chair with at least two lever control arms activating said movements respectively comprising the steps of:
 (a) attaching first and second lever control arms below a seat of said chair, said first and second lever control arms with an end having a first and second geometric shape, respectively, wherein said first geometric shape is different from said second geometric shape,
 (b) displaying a guide on an arm of said chair, said guide having said first and second geometric shapes with information associating said movements with said first and second geometric shapes of said lever control arms respectively.

19. At least two control levers as claimed in claim 1, wherein said guide is disposed on an arm of said resting device.

20. At least two control levers as claimed in claim 1, wherein said guide comprises a computer screen.

* * * * *